Oct. 15, 1935.   A. G. EKLUND   2,017,091
PRINTING TELEGRAPH SYSTEM
Filed Feb. 7, 1934
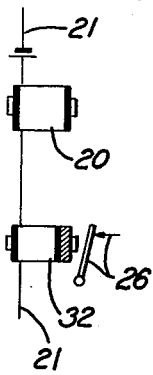
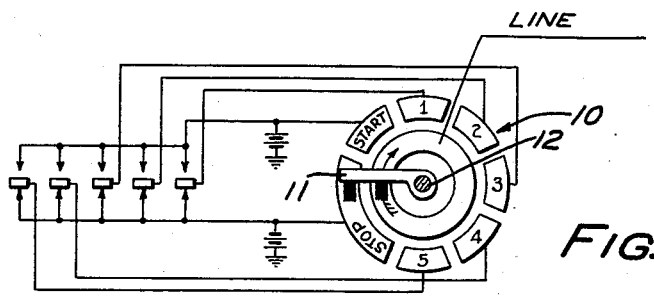
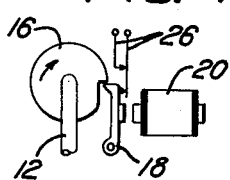
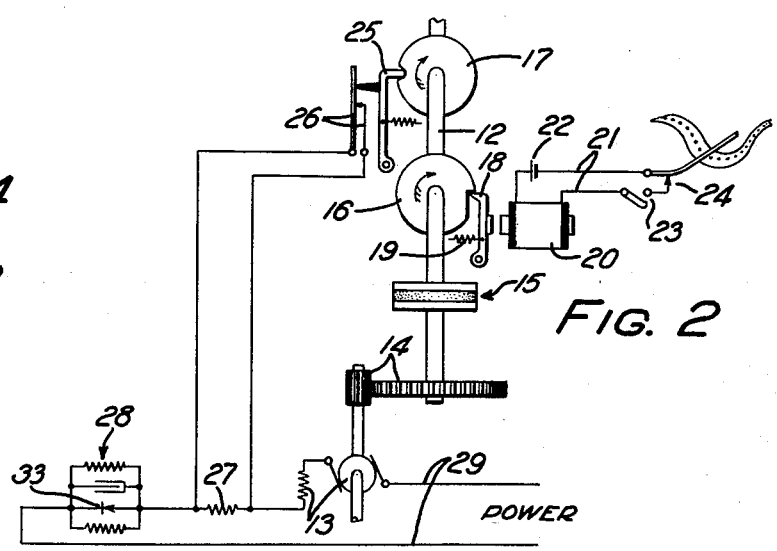
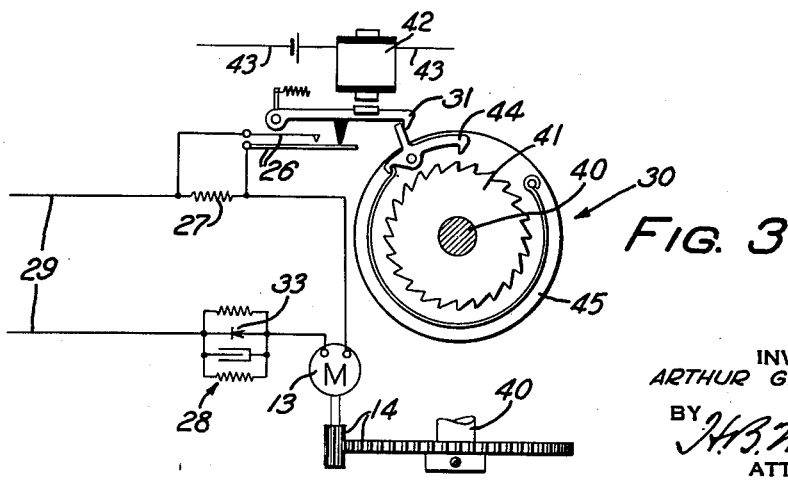
INVENTOR
ARTHUR G. EKLUND
ATTORNEY Patented Oct. 15, 1935

2,017,091

UNITED STATES PATENT OFFICE 2,017,091

PRINTING TELEGRAPH SYSTEM

Arthur G. Eklund, Chicago, Ill., assignor to Teletype Corporation, Chicago, Ill., a corporation of Delaware Application February 7, 1934, Serial No. 710,106

5 Claims. (Cl. 178—53.1)

This invention pertains to printing telegraph systems and more particularly to motor drive arrangements therefor in which electric power is applied to the motor in proportion to the load thereon.

In automatic telegraph systems wherein telegraphic printers and automatic transmitters are driven by small electric motors, it is required that the motors run at uniform speed, and any variation from a predetermined speed is likely to interfere with the proper operation of the printing telegraph apparatus. Such variations have occurred in start-stop systems heretofore due to the difference in the load of the motor when a clutch of friction type is being slipped as compared with the lesser load during normal telegraphic transmission, or due to the difference in the load of the motor when running free during idle periods as compared with the greater load when driving a printing telegraph mechanism through a clutch of seizing type during periods of telegraphic transmission. A motor will increase its speed slightly when the load is lighter despite the fact that commercially efficient speed governing devices are applied to the motor for speed control.

For complete regulation of the speed of a driving motor for telegraphic communication, it is required that the speed of the motor be regulated to the same speed during communicating periods of the telegraph set and during idle periods, and therefore an adjustment is needed to provide satisfactorily for change from idling to communicating conditions of the motor and its driven telegraph set.

Further, in a speed regulator which contains an electrical contact for controlling the speed of a motor by varying the potential applied to the motor, when the several elements making up the speed regulator are not properly adjusted to the motor and its load, an excessive or unnecessary sparking will occur at the contact, which is injurious to the contact and results in additional maintenance. In such a structure, a variation in the load of the motor without corresponding readjustment of the elements of the speed governing system will cause sparking at the governor contact, and it is desirable that such conditions be avoided.

Accordingly an object of this invention is to provide in a telegraph system means for controlling the application of electrical potential to the motor dependent on its condition of operation with the associated apparatus.

A further object is to eliminate or reduce sparking at the governor contact and thus provide improved operating conditions.

A feature of the invention is to provide means whereby the act of applying a greater load to the motor may concomitantly or resultantly apply the greater electrical potential to the motor.

The above and other objects are attained by utilizing a clutch or load-varying structural element to perform the additional function of varying the electrical potential applied to the motor, or by utilizing an off-normal contact point which will apply or remove a potential varying element in the electrical power circuit of the motor whenever a start-stop member of the printing telegraph device is in an operating position other than normal, or by a relay.

The complete system of this invention therefore comprises a motor-driven start-stop telegraph instrument having a variable potential for the electric motor, the potential upon the motor being varied simultaneously with the variation of the load upon the motor.

The apparatus added to the mechanism of a start-stop telegraph set may be either a clutch controlled contact such that the contact will be operated when the start-stop clutch is operated, the contact functioning to vary the electrical power applied to the motor, and the clutch mechanism thus operating in two functions of applying the load to the motor and of applying a higher electrical power to the motor, or a start-stop member of the telegraph set may operate a contact and thus may vary the potential applied to the electric motor as a result of the change to working condition in the telegraph set driven by the motor, or a relay may respond to clutch control conditions. In any case, the application of the higher electrical power to the motor will correspond to the application of the greater load to the motor whether the greater load be when operating the telegraphic equipment, as in the case of a grab clutch, or whether the greater load be when not operating the telegraphic equipment, as in the case of a friction clutch.

A better understanding of the invention may be had from the following description, taken in connection with the accompanying drawing wherein, Fig. 1 shows a telegraph instrument adapted to be driven by a motor;

Fig. 2 shows a motor and friction clutch with speed regulating devices for driving the instrument shown in Fig. 1;

Fig. 3 shows a motor and grab clutch with speed regulating devices;

Fig. 4 shows a variation of Fig. 2 in which speed regulating contacts are controlled directly by a clutch member, and Fig. 5 shows speed regulating contacts controlled by a relay.

Referring to Figs. 1 and 2 jointly, transmitting distributor 10 has its brush arm 11 driven by shaft 12 which is driven by motor 13 through gears 14 and friction clutch 15. Fixed to shaft 12 are cams 16 and 17, start-stop cam 16 being engageable by stop armature 18 under control of spring 19 or magnet 20 to stop the shaft 12 and to compel the slipping of clutch 15 or to release shaft 12 and cause its rotation by power transmitted through clutch 15. The energy required to slip clutch 15 is greater than the energy required to operate brush arm 11, otherwise brush arm 11 could not be operated. Motor 13 therefore has a lighter load when shaft 12 is rotating. Magnet 20 is connected in circuit 21 in series with a battery 22, a manual switch 23, and a tape-controlled switch 24.

Cam 17 has follower 25 adapted to operate electrical contacts 26 which are connected to the terminals of resistance 27 in a power circuit which includes also motor 13, armature and field, speed governor 28 with centrifugal contact 33, and wires 29 leading to a source of power not shown.

Fig. 3 shows an alternative form of control cooperating with a grab clutch 30 in which the power varying contacts 26 are operated to close when the clutch is operated to drive, the power varying contacts being operated directly by the clutch member 31 and not resultantly as in Fig. 2.

In Fig. 4 an arrangement of power varying contacts 26 is shown such that contacts 26 are operated directly by the clutch releasing member 18 shown in Fig. 2.

In Fig. 5 a modification is shown in which the power varying contacts 26 are operated electrically by a relay 32 which may be of the slow-to-release type, and whose winding is connected in circuit with the winding of the clutch magnet 20 (or 42) whereby energization of clutch magnet 20 is accompanied by energization of relay 32, and the arrangement of contacts of relay 32 being such that when the greater load is applied to the motor by an associated clutch magnet, the greater potential also is applied to the motor by contacts 26.

The operation of the invention is as follows: When it is desired to transmit continuously from distributor 10, magnet 20 is continuously energized by closing manual switch 23 in circuit 21 which will release shaft 12 and will reduce the load in motor 13. In the types of apparatus shown in Figs. 4 and 5, this will result also in a decrease in the electrical power applied to the motor because the contacts 26 will be held open continuously, thus including resistance 27 in the power circuit of motor 13, while in the type shown in Fig. 2 with cam 17, contacts 26 will be opened similarly except that they will be closed momentarily each time shaft 12 passes its normal position.

In the arrangement shown in Fig. 4, continuous energization of magnet 20 switch 23 and circuit 21 as in Fig. 2 holds contacts 26 continuously open and thus removes the shunt continuously from resistance 27, while in the arrangement shown in Fig. 5 a continuous energization of relay 32 included with magnet 20 in a circuit 21 as shown in Fig. 2 simultaneously holds contacts 26 open and thus removes the shunt continuously from resistance 27. In use with a printer where a single starting impulse is given to the clutch for each received code, a slow-to-release relay 32 holds the contacts continuously operated in response to the recurrent starting impulses.

In designing an equipment such as shown in Fig. 2, governor 28 has its desired electrical constant values determined to produce minimum sparking at contact 33 when motor 13 is running at the desired speed with magnet 20 deenergized and with shaft 12 stopped. Magnet 20 then is energized and shaft 12 is permitted to run, thus opening contacts 26 and including resistance 27 in the motor circuit. The value of resistance 27 is determined such as to produce the desired speed of motor 13 which will, at the same time, produce a minimum of sparking at contact 33.

In the arrangement shown in Fig. 3, motor 13, when its telegraph instrument is not operating, has no load other than to turn a shaft 40 and an idle toothed wheel 41 of the clutch 30. The governing system therefore is arranged to include resistance 27 in the motor circuit in order to give the motor a minimum of current corresponding to its period of minimum work. Contacts 26 normally are open as shown.

When it is desired to operate continuously with the arrangement of Fig. 3, magnet 42 is continuously energized by closing circuit 43 which will attract and hold armature 31, thus releasing latch 44 of clutch 30 to engage wheel 41 and to drive disc 45 which is the start-stop member of clutch 30 and which is the member to which the load as distributor 10 is attached. Armature 31 thus places a load upon the motor 13 and at the same time armature 31 operates contacts 26 to shunt resistance 27, thus increasing the electrical potential upon the terminals of the motor 13 in accordance with the increased load.

In designing the equipment shown in Fig. 3, governor 28 has its desired electrical constant values determined to produce minimum sparking at contacts 33 at the desired motor speed when magnet 42 is energized and the telegraph instrument is operating. Magnet 42 then is deenergized, thus opening contacts 26 and including resistance 27 in the motor circuit, and a value for resistance 27 in Fig. 3 then is determined such as to produce the desired speed of motor 13 which will at the same time produce a minimum of sparking at contact 33.

A friction clutch of the type shown in Fig. 3 is described in detail in Patent 1,745,633, issued February 4, 1930 to S. Morton et al., and a grab clutch of the type shown in Fig. 3 is described in detail in Patent 1,682,889, issued August 12, 1926 to F. G. Creed.

By the application of this invention to existing types of telegraphic apparatus, sparking at governor contacts and maintenance cost may be reduced, a more uniform speed can be attained by telegraphic motors, and a more uniform and satisfactory service can be given by motor-driven telegraphic instruments.

The invention claimed is:

1. In a start-stop motor-driven telegraph unit, a continuously rotating power element, a start-stop element driven intermittently by power derived from said power element, means for associating said start-stop element with said power element, and means operable after operation of said last recited means and after said start-stop element has started to vary the effect of said power element.

2. In a start-stop power-driven telegraph unit, power-driven means to transmit telegraph signals, a source of power for said power-driven means, means to start said power-driven means to transmit signals, and further means responsive to the starting of said power-driven means to vary the effect of said source of power.

3. In a start-stop motor-driven telegraph unit, a continuously rotating power element, a start-stop element driven intermittently by power derived from said power element, means for associating said start-stop element with said power element, and means effective through one transmission cycle of said start-stop element and after operation of said first mentioned means and after said start-stop shaft has started to vary the effect of said power element.

4. In a start-stop telegraph system, an instrumentality effective during a cycle of operation for transmitting a group of impulses indicative of a character, means for operating said instrumentality, means operatively connected with said operating means for varying its output, and means effective while said instrumentality is ineffective for transmitting character impulses for rendering said last mentioned means effective to increase the output of said operating means.

5. In a start-stop telegraph system, a teliegraph instrument including a start-stop friction clutch, a motor connected to said instrument by said start-stop friction clutch, a resistor, and means controlled by said instrument after starting to switch said resistor into the power circuit of said motor.

ARTHUR G. EKLUND.